United States Patent

[11] 3,633,599

[72] Inventor Robert R. Roos
    Decatur, Ill.
[21] Appl. No. 69,876
[22] Filed Sept. 4, 1970
[45] Patented Jan. 11, 1972
[73] Assignee Mueller Co.
    Decatur, Ill.

[54] PLASTIC SERVICE FITTING AND METHOD AND APPARATUS FOR ATTACHING SAME
22 Claims, 5 Drawing Figs.

[52] U.S. Cl.................................................. 137/15,
                                                        137/318
[51] Int. Cl................................................ F16l 47/02
[50] Field of Search.................................... 137/315,
                                                317, 318; 29/157 T, 47 S

[56] References Cited
UNITED STATES PATENTS

| | | | |
|---|---|---|---|
| 3,176,708 | 4/1965 | Shields........................ | 137/318 |
| 3,349,792 | 10/1967 | Larkin........................ | 137/318 |
| 3,460,553 | 8/1969 | Leopold, Jr. et al......... | 137/318 X |
| 3,516,426 | 6/1970 | Toll............................. | 137/318 X |

Primary Examiner—M. Cary Nelson
Assistant Examiner—David R. Matthews
Attorney—Cushman, Darby & Cushman ABSTRACT: A method and apparatus for attaching a plastic service fitting to a plastic main carrying fluid under pressure wherein a tubular fitting having a lateral outlet is disposed in a support housing and a connecting member carrying a tapping plug is disposed at one end of the tubular fitting and linked by a driving shaft to a driving head disposed atop the support housing. The tapping plug has a cutter element and coupon retainer located adjacent the frustoconical end portion of the connecting member which is placed in contact with the surface of the plastic main. A load is applied through the housing to the tubular fitting and to the connecting member while the driving head, driving shaft, cutter and connecting member are rotated to press the cutting member into the pipe and cut a perforation therein whereby frictional heat is developed between the surfaces of the connecting member, a tubular fitting and plastic main to form a fluidtight seal between these members as the perforation is formed.

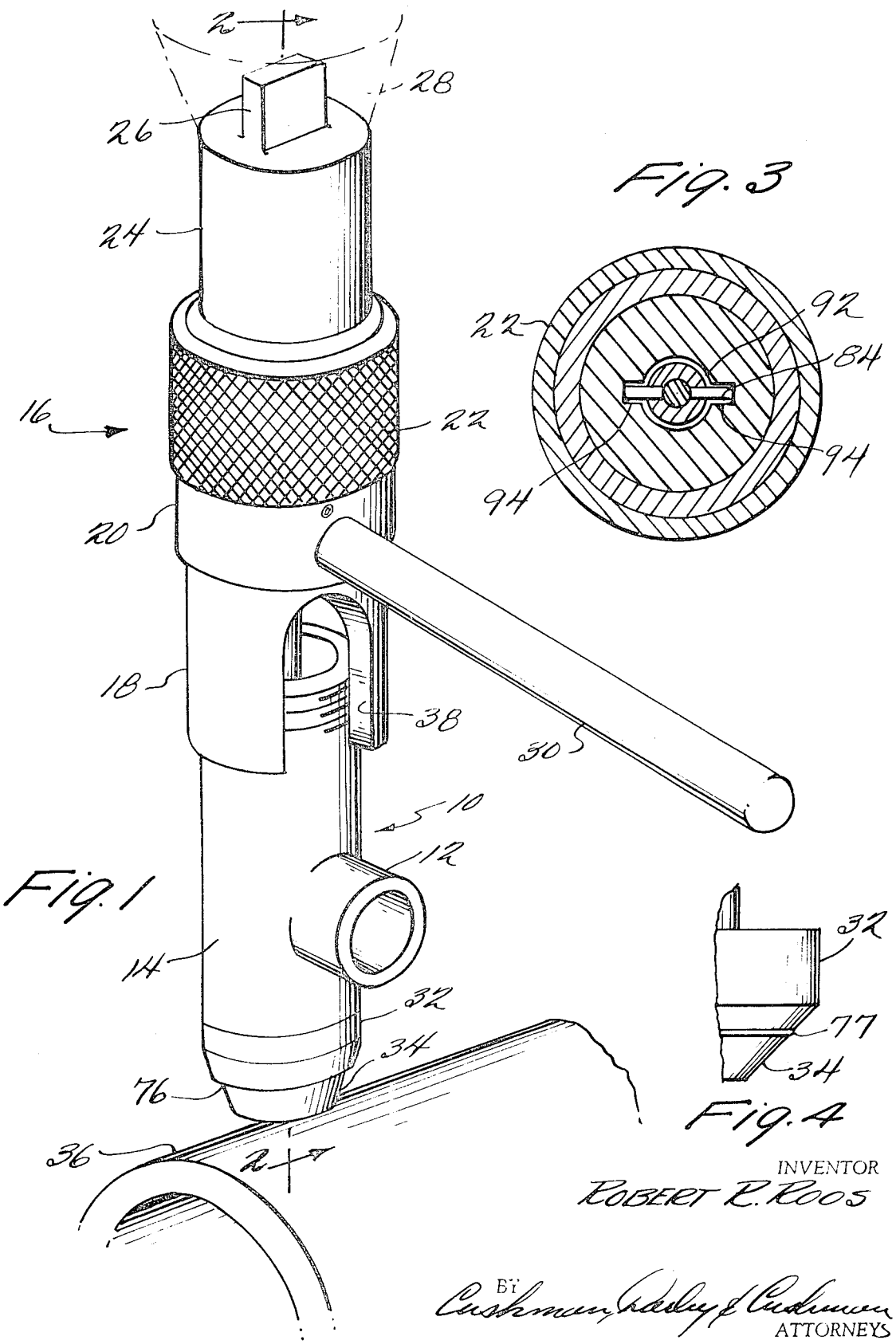

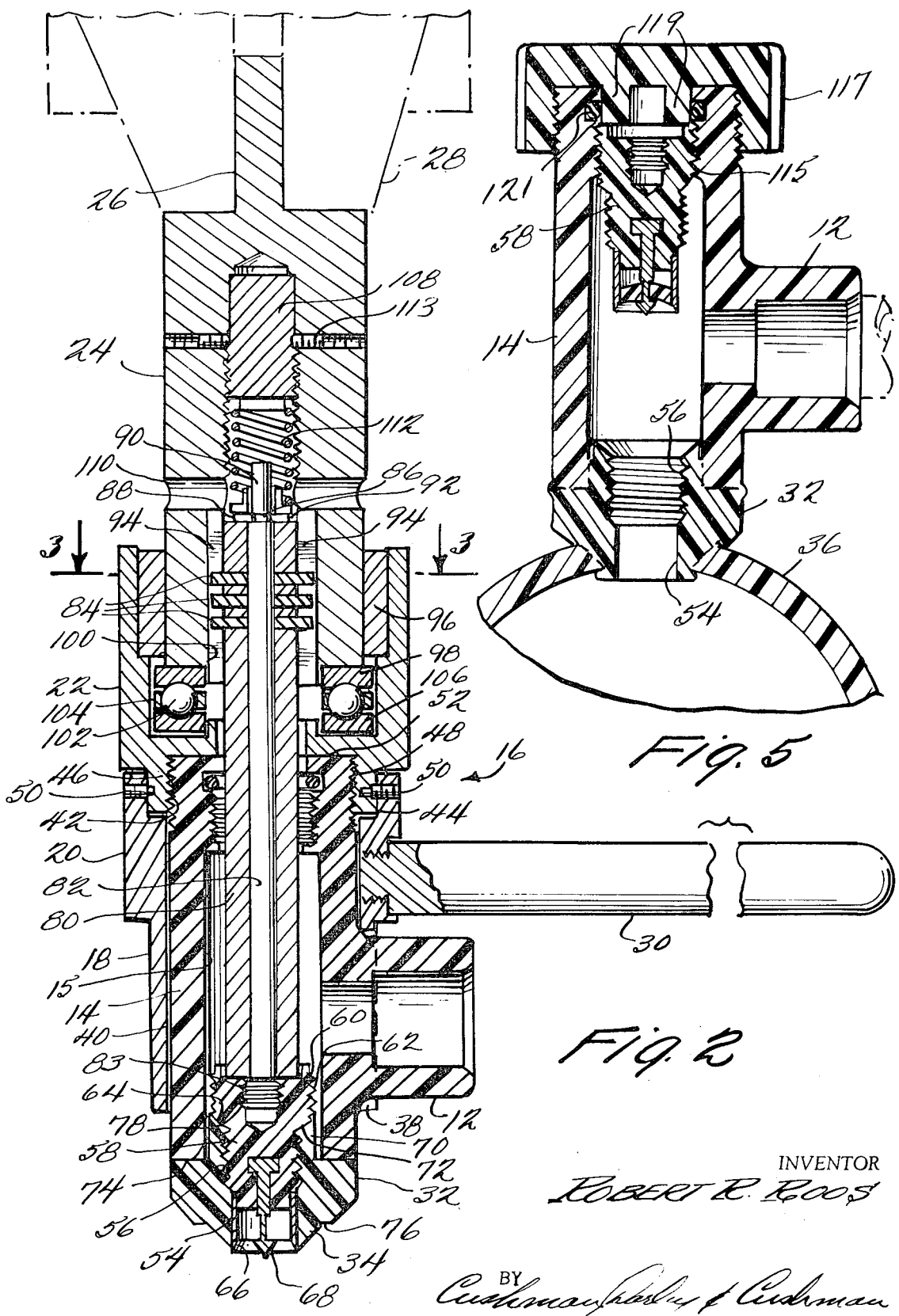

3,633,599

PLASTIC SERVICE FITTING AND METHOD AND APPARATUS FOR ATTACHING SAME

The present invention relates to a method and apparatus for securing a plastic service fitting to a plastic main carrying fluid under pressure and more particularly, for friction welding the service fitting to the main and simultaneously tapping a perforation through the wall of the main without permitting escape of any fluid to the atmosphere.

BACKGROUND OF THE INVENTION

The use of plastic mains particularly for gas distribution together with the use of plastic service pipes linking individual dwellings to such mains are presently becoming more widespread due to the economies of manufacturing such conduits together with the saving with regard to transportation and storage weight. The resistance of such conduits to corrosion has also contributed to their expanded popularity in the gas distribution field.

The use of plastic materials in the construction of both the mains and the service pipes, however, has rendered unsatisfactory the use of the usual metallic service connectors to establish communication between the main and service pipe in view of the expense incurred in an attempt to establish a permanent fluid-type seal that will hold up under long use. Obviously, it is desirable to make the connection of a service pipe to a plastic main without allowing any escape of fluid to the atmosphere, and even more desirable when the main carries gas, the escape of which would create a hazardous condition. This latter problem is particularly acute where the main carries gas at high pressure.

Many of the plastic service and tapping T's that have been proposed have lacked satisfactory means for inhibiting leakage of fluid from the main to the atmosphere during the connecting operation. Additionally, in carrying out the tapping operation some of the prior art devices operate devices such a fashion as to allow chips and cuttings to fall into the main. Creation of such debris in the main is highly undesirable as these cuttings eventually will find their way into a valve system or even enter service lines themselves resulting in the clogging of valves or burners located along the line.

Securement of the plastic service fittings of the prior art to a main have, in general, involved the use of cumbersome clamp structures or saddles, which were awkward to handle. Considerable time is consumed in attaching such devices to a main without attainment of an unusually strong or fluidtight joint in comparison with the time expenditure required.

It has also been suggested in the prior art in connection with the use of plastic service fittings and plastic T's the use of solvent welds to form a fluidtight connection between the fitting and the main. Such methods require considerable skill in application of the solvent to the surfaces to be joined as well as a considerable time expenditure for establishing each connection since the solvent not only must be applied to the surfaces and the fitting disposed in place, but one must wait until the weld hardens before the fluid communication can be established between the main and the service pipe.

It will be seen by those experienced in this field that the method and apparatus of the present invention substantially avoids the problems encountered by the structures and methods of the prior art as set forth above. When consideration is given to the following detailed description, it will be seen that the present invention consists of a method and apparatus whereby a plastic service fitting can be connected to a plastic main and at the same time a perforation formed in the main without resorting to the use of cumbersome mechanical attachment devices or to the use of chemical solvents and which can be carried out even by a relatively unskilled worker in considerably less time than has heretofore been possible.

SUMMARY OF THE INVENTION

An object of the present invention is to provide a method wherein a plastic tubular fitting may be secured to a connecting member by a friction weld and the connecting member can be secured to a plastic main also by a friction weld while simultaneously cutting a hole in the wall of the main to establish fluid communication between the main and the service fitting. The method is carried out by placing one end of the annular surface of the tubular fitting in contact with an annular surface on the connecting member. The connecting member is provided at its other end with a frustoconical surface portion and is also formed with a through-bore which is alignable with the bore of the tubular fitting. The tapping plug having a cutter and coupon retainer is disposed in the connecting member with the leading edge of the cutting element adjacent the end of the bore of the connecting member. In carrying out the method of the present invention, the connecting member is disposed against the exterior wall of the main and the tubular fitting is pressed against the connecting member; an additional force is imposed on the connecting member independent of the load transmitted through the tubular fitting. Then the connecting member together with its tapping plug and cutter are rotated at a speed sufficient to generate frictional heat between the surface of the connecting member in contact with the surface of the tubular fitting as well as between the surface of the pipe main in contact with the end portion of the connecting member so that the frictional heat will melt the material of the surfaces in contact. Due to the simultaneous application of a load to the fitting and the connecting member as the rotation takes place, the frustoconical end portion and cutter of the connecting member will move into the surface of the pipe main. The application of the load and the rotation is continued until a perforation is formed through the wall of the main whereupon the rotation is stopped. The application of the load is continued until the softened plastic materials of the surfaces in contact become solidified to form a fluidtight weld therebetween.

The present invention also consists in the provision of an apparatus in the form of a tool to carry out the foregoing method, together with a service fitting, connecting member and tapping plug adapted to cooperate with the tool. A housing is provided in which the tubular fitting may be disposed and retained and consists in a provision of a lower tubular housing provided with a slot in its wall. The plastic tubular fitting is designed to fit into the housing and is equipped with a lateral outlet which is positioned in the slot of the housing. The fitting is provided with external threads about its upper end as well as an interior groove for accommodating an O-ring and internal threads along its interior wall beneath the O-ring. The lower end of the tubular fitting is formed with a smooth flat annular surface. Upon the upper portion of the housing is disposed a rotatable collar having internal threads about its lower portion for cooperation with the external threads formed on the upper external portion of the tubular fitting. Means are provided for securing the collar to the housing to prohibit rotation with respect to the housing after the tubular fitting is disposed in the housing and threaded into the collar. A plastic connecting member is provided and consists of a bushing having a through-bore. The external diameter of the bushing is approximately the same as the external diameter of the tubular fitting. The upper portion of the bushing is formed with a flat annular surface for contacting the aforementioned end portion of the tubular fitting. The bushing is provided with a neck portion which has an external diameter approximately equal to the interior diameter of the tubular fitting so that the neck portion may be inserted into the bore of the tubular fitting. The bushing is provided with a central bore alignable with the bore of the tubular fitting and is threaded adjacent the neck portion to receive and hold a tapping plug therein so that the cutting element of the tapping plug will be disposed adjacent the other end of the bore of the bushing. The external surface of the bushing adjacent the cutting element is given a frustoconical shape to facilitate the attachment of the bushing to a pipe main. A depth indicator may be suitably disposed about the circumference of the frustoconical end portion to indicate when the cutter has pierced the pipe main. The tapping plug is provided, as noted above, with a circular cutting element at one end. Centrally disposed and extending from the body of the tapping plug is a coupon retainer. The upper end of the tapping plug is provided with a threaded bore as well as means for engaging a driving shaft, as will be more fully described hereinafter. The external upper portion of the tapping plug is threaded to engage the internal threads disposed at the upper end of the tubular fitting. The upper end of the collar is formed to receive and support the lower end of a driving head. The driving head is arranged to carry a driving shaft as well as a positioning shaft. The driving shaft extends centrally through the housing and is keyed for rotation with the driving head. The lower end of the driving shaft engages the upper end of the tapping plug so that upon rotation of the driving head and driving shaft, rotation of the plug and the connecting member or bushing connected thereto will also be effected. The upper end of the driving head is provided with connecting means either in a form of a tongue or a groove for cooperation with a rotary power tool. A positioning shaft is located in a central bore provided in the driving shaft and has its lower end threaded for engaging the internally threaded bore of the tapping plug. In assembly, the tapping plug is threaded into the connecting member and then the connecting member is inserted into the lower end of the tubular fitting while the positioning shaft is threaded into the bore of the tapping plug to bring the surface of the tapping plug into engagement with the lower surface of the driving shaft.

Having assembled the various parts of the service fitting, the tool and fitting may be positioned in contact with the service main and a rotating power tool connected to the driving head. In operation, the tubular fitting will be held against rotation while the connecting element and tapping plug are rotated to create frictional heat while the cutting element on the tapping heads simultaneously cuts a perforation in the plastic main.

It will be appreciated that the method and apparatus of the present invention will permit the establishment of a secure, fluidtight connection between a plastic service fitting and a plastic main in considerably less time and at considerably reduced expense than has heretofore been possible in using the methods and apparatus proposed by the prior art.

Accordingly, an object of the present invention is the provision of a method for connecting a plastic service pipe to a plastic main without escape of fluid from the main to the atmosphere even though such main carries fluid under high pressure when the connecting operation is carried out.

Another object is to provide a method wherein a plastic service fitting is secured to a main without the use of mechanical clamps or like attaching devices.

A further object off this invention is to provide a method wherein the connection may be effected in considerably less time than has heretofore been possible.

Still another object of this invention is to provide a method wherein the tubular fitting is secured to the plastic main and at the same time a perforation is formed in the main.

Another object is to provide an apparatus for carrying out the method which enables the user of the device to safely perform a perforating and welding operation simultaneously without allowing escape of fluid under pressure into the atmosphere.

Yet another object of the present invention is to provide a plastic service fitting and connecting element adapted to cooperate with the apparatus of this invention.

Other objects and advantages of the invention will become apparent from the following description and accompanying drawings.

BRIEF DESCRIPTION OF THE DRAWINGS

FIG. 1 is a view in perspective of the tool and tubular plastic fitting of the present invention.

FIG. 2 is a view in section taken along the link 2—2 of FIG. 1 showing the plastic tubular fitting, connecting member and tapping plug inserted into the tool of the present invention.

FIG. 3 is a view in section taken along the line 3—3 of FIG. 2 showing the cooperation between the driving shaft and driving head.

FIG. 4 is a view of the external surface of the connecting member showing a modification of the connecting member.

FIG. 5 is a view in section showing the completed installation of the plastic fitting.

DETAILED DESCRIPTION OF THE INVENTION

Referring now the drawings, wherein like reference characters designate like or corresponding parts throughout the several views, there is illustrated in FIG. 1 a plastic tubular service fitting, generally designated at 10 having a lateral outlet 12 extending generally transversely of the longitudinal axis of the tube 14 of the tubular service fitting. The tool of the present invention, generally designated at 16 in FIG. 1, is shown with the upper end of tubular fitting 14 partially inserted into the lower portion of the support housing 18. The upper portion 20 of the support housing has a rotatable collar 22 disposed thereon. The exterior surface of collar 22 is knurled to facilitate manual rotation thereof. A driving head 24 is shown disposed in the collar 22. Suitable means such as a tongue 26 may be supplied atop driving head 24 for connection with a suitable power tool designated generally by the phantom lines at 28. To facilitate operation of the tool, a handle 30 may be attached to the exterior wall of the upper support housing 20.

Disposed in contact with the lower portion of the body of the plastic tubular fitting is a plastic connector member 32 having a frustoconical end portion 34 contacting the outer surface of a plastic main 36. It will be seen that the slot 38 provided in the wall of support housing 18 will engage the lateral outlet 12 as the body 14 is inserted into housing 18.

REferring now to FIG. 2 of the drawings, there is shown the apparatus of the present invention in a relation that is assembled as follows. With the tool 16 in a horizontal position, the tube 14 of the tubular fitting is inserted into the bore 40 of housing 18. The upper exterior end portion of tube 14 is threaded at 42. The upper portion 20 of the support housing is formed with a counter bore 44 to receive the lower neck portion 46 of collar 22. The interior wall of neck portion 46 is threaded at 48 to cooperate with the exterior threads 42 of the tubular fitting. Setscrews are provided to extend through apertures in the upper wall portion of housing 20 and cooperate with a circumferential channel formed in an outer wall of neck portion 46 so that when the screws are loose collar 22 may be rotated yet retained upon the upper portion 20 of the support housing. Of course, after the tube 14 of the tubular fitting has been threaded into the neck portion 46 into abutting relationship with the radially interiorly extending flange 52 of the collar, the setscrews are tightened to restrict rotation of the collar 22 with respect to the support housing. Since the tubular fitting 14 is held stationary while collar 22 is rotated to carry out the threading operation, lateral outlet 12 may be easily guided into slot 38.

Next, the plastic connector member 32 which is formed with a central bore 54 which is threaded at 56, is provided with a tapping plug 58. The tapping plug 58 is formed with a head portion 60 having external threads 62 and a tapered annulus 64. The lower portion of plug 58 is provided with external threads for cooperating with the threads 56 on connector member 32. A circular cutter 66 and a coupon retainer 68 are suitably affixed to the end portion of tapping plug 58. The connector member 32 is provided with a neck portion 70 having an interiorly tapered annular surface portion 72 for cooperating with the tapered annulus 64 of the plug 58 so that when plug 58 is threaded into the bore of connector member 32, the respective annular surfaces may be forced into fluidtight contact. The exterior diameter of the neck portion 70 is slightly less than the interior diameter of the bore 15 of the tubular fitting. A flat annular surface 74 is provided around neck portion 70 on the upper portion of connector member 32 and is adapted to engage the flat end surface of tube 14. A shoulder 76 may be provided around the frustoconical end portion 34 of connector member 32 and is so spaced from the end of member 32 as to serve as a depth indicator to indicate to the operator of the apparatus when the cutting element 66 has penetrated through the wall of plastic main 36, as will be hereinafter more fully described. Referring to FIG. 4, there is shown an alternate form of the connector member 32 wherein a circumferential rib 77 is disposed on the frustoconical surface to function as a depth indicator. The head portion 60 of tapping plug 58 is provided with a centrally located threaded bore 78. A plurality of grooves (not shown) are sunk into the end portion of head 60 and surround and are spaced from the bore 78.

A hollow driving shaft is inserted down through collar 22 and housing 18 and carries a shaft 82 rotatably disposed within it. The lower portion of shaft 82 is threaded at 83 to engage the threaded bore 78 of plug 58. The lower end portion of driving shaft 80 is formed with teeth or lugs (not shown) for engaging the grooves formed in head portion 60 of tapping plug 58. Adjacent the upper end of shaft 80 are a plurality of key members 84. The upper end portion of shaft 82 extends beyond the end of shaft 80 and is provided with a groove 86 for accommodating a ring 88 for positioning shaft 82 with respect to shaft 80.

To effect assembly, plug 58 is first threaded into the bore of connector member 32. Then the neck portion 70 of connector member 32 together with the upper portion of plug 58 is inserted into the bore 15 of tube 14 so that upon rotation of shaft 82 threads 83 of shaft 82 will engage the threaded bore 78 of plug 58 and pull the plug 58 and the connector element 32 attached to plug 58 into the bore of tube 14. The rotation of shaft 82 may be effected manually by grasping the upper end portion 90.

After shafts 80 and 82 have been properly connected to plug 58 as set forth above, the apparatus as thus far assembled may be placed in position with the lower end portion of the connector element in contact with the exterior surface of the plastic main 36.

Next, driving head 24 which is provided with a central bore 92 and key slots 94 as best seen in FIG. 3, is inserted into collar 22 with key members 84 fitting into key slots 94 and shaft 80 fitting into the lower portion of bore 92. The exterior sidewalls of the lower portion of driving head 24 when disposed within collar 22 engage the interior wall of a circular press fitted bushing 96 while the lower flat end portion of the driving head 24 abuts a rotatable bearing ring 98. A downwardly extending neck portion 100 may be provided on the lower end portion of driving head 24 interiorly thereof to engage the interior sidewall of bearing ring 98. Immediately beneath bearing ring 98 there are disposed a plurality of ball-bearings 102 held in position by means of a retainer ring 104. Immediately beneath ball-bearings 102 there is provided a second bearing ring 106 which rests on the top side of flange 52. Both bearing ring 98 and 106 are provided with oppositely facing raceways for guiding the ball-bearings 102.

It is known in the plastic welding art that the amount of frictional heat generated is proportional to the product of the surface areas of the materials in contact and the force applied to maintain the surfaces in contact. With reference to FIG. 2, it will be seen that the surface area in contact between the tubular fitting 14 and the upper portion of the connecting member 32 is greater upon initiation of the welding process than the surface area in contact between the frustoconical end portion 34 and the plastic main 36 so that, by virtue of the differential between the surface areas, frictional heat will be generated much more rapidly between the tubular fitting 14 and the upper portion of the connector member 32 than between the frustoconical end portion 34 and the plastic main 36 if a single predetermined load were applied along the longitudinal axis of the tubular fitting 14. As a consequence, bonding between the tubular fitting 14 and the upper portion 74 and 70 of the connector member 32 may occur before the surface portion 34 and cutter element 66 have penetrated the wall of the plastic main 36. To compensate for the difference in surface areas, the apparatus of the present invention provides means for supplying a load to the lower end portion 34 of connector member 32 in addition to the load transmitted manually by the operator of the device through the driving head, collar, support housing and tubular fitting 14.

More specifically, the upper portion of bore 92 in driving head 24 is threaded to receive a threaded bushing 108 and a spring washer 110 is located about shaft 82 and rests on ring 88 which is in contact with the upper end of shaft 80. A coil spring 112 is disposed to extend longitudinally of bore 92 having one end in contact with the lower end of bushing 108 and its other end in contact with spring washer 110. Since bushing 108 may be adjustably positioned longitudinally in bore 92, the compression of spring 112 may be varied to obtain the desired load on shaft 80 which is transmitted through the plug 58 to the lower portion of connector member 32. Once having positioned bushing 108, setscrews 113 may be tightened to secure the bushing in place.

In carrying out the method of the present invention in conjunction with the apparatus assembled as described above, the operator will connect the rotary output member of a power tool designated generally at 28 in FIG. 2 with the tongue 26 of driving head 24. The power tool should be designed, of course, so that he may operate the tool and apply a downward pressure or load on the driving head with one hand and grasp the handle 30 with his other hand to facilitate thereby the maintaining of the longitudinal axis of the housing 18, as well as the tubular fitting 14, generally perpendicular to the surface of the plastic main 36.

Upon actuation of the power tool, rotary motion will be transmitted to driving head 24, to shaft 80 by means of the cooperation between key slots 94 and keys 84, through the lugs formed at the end of shaft 80 to plug 58 and through the threaded connection between plug 58 to connector member 32. Shaft 82 is free to rotate with plug 58 although the thread connection between shaft 82 and bore 78 is opposite the threaded connection between plug 58 and connector member 32. Upon rotation of connector member 32, frictional heat will be developed between surface 74 of connector member 32 and the end portion of the body of tubular fitting 14. If desired, the exterior surface of neck portion 70 may be formed to contact the interior wall of bore 15 of tubular fitting 14 so that a weld may be formed therebetween. The frictional heat developed between the end of frustoconical surface portion 34 and the surface of main 36 together with the application of pressure will cause the connector member to melt its way down into the main while the rotating cutter element 66 will form a perforation through the wall of the main by cutting a coupon which will be impaled upon the coupon retainer 68. Rotation is continued until the annular shoulder 76 abuts the surface of main 36, indicating thereby that the cutter has moved completely through the wall of the main. Thereupon rotation of connector member 32 is discontinued but the application of force is maintained to permit the melted plastic materials to solidify and form a fluidtight seal.

Subsequent to the completion of the welding, power tool 28 and driving head 24 are removed. Then setscrews 50 are loosened and collar 22 disengaged from the threaded portion of tubular fitting 14. Shaft 82 is then disengaged from bore 78 of plug 58 and removed along with shaft 80.

When main 36 is carrying a fluid under pressure, it is, of course, desirable to leave plug 58 threaded into the bore of connector member 32 until a service line is connected to lateral outlet 12. Subsequent to such connection, of course, a suitable tool may be employed to disengage plug 58 from connector member 32 to thread it into the upper portion of tubular fitting 14 by means of the interior threads 115 as shown in FIG. 5. A cap 117 may then be threaded onto the upper end of tubular fitting 14, the cap being provided with depending ears 119 for compressing an O-ring 121 located in a circumferential channel adjacent the upper end of tubular fitting 14.

Alternatively, the upper portion of plug 58 may be formed so as to compress O-ring 121 when plug 58 is threaded into juxtaposition therewith.

Implementation of the method and apparatus of this invention, as exemplified in the above-described embodiment, has permitted, in actual practice, attachment of a service fitting to a main in less than 1 minute. By providing a connector member that is rotated independently of the body of the fitting 14, the lateral outlet 12 may be positioned in any desired direction to facilitate its connection with a service pipe. However, in installations where such positioning is not critical, connector member 32 can be formed integrally with the body of tubular fitting 14 and the apparatus of the support housing modified so that the tubular fitting may be free to rotate with the connector member.

Furthermore, driving head 24 may be modified to carry shafts 80 and 82 within it. Of course, a suitable mechanical linkage would be provided to effect the rotation of shaft 82 for the purpose described above as well as access means to adjust the position of bushing 108.

From a consideration of the foregoing, it will be seen that the objects of this invention may be readily accomplished by implementation of the method and apparatus herein disclosed. It will be realized, however, that various changes may be made in the specific embodiment shown and the method described without departing from the spirit and scope of the invention as defined in the appended claims.

What is claimed is:

1. The method of friction welding a plastic tubular fitting having a through-bore and a frustoconical end portion carrying a cutter to a plastic pipe comprising the steps of:
   positioning said fitting generally transverse of the longitudinal axis of said pipe with said end portion engaging the exterior surface of said pipe,
   applying a load along the longitudinal axis of said fitting to press said tubular fitting against said pipe,
   rotating said tubular fitting about its longitudinal axis at a high speed relative to said pipe while applying said load to develop frictional heat between the areas of said end portion in contact with said surface of said pipe to soften the contacting materials of said end portion and said pipe so that said end portion will move through the softened material to thereby increase the area of surface contact between said pipe and said end portion,
   cutting a hole through said surface of said pipe as said rotating end portion is pressed into said pipe surface,
   discontinuing said rotation upon completing said hole cutting, and
   discontinuing application of said load to said tubular fitting when said contacting plastic materials of said end portion and said pipe have become bonded to one another.

2. The method of friction welding to a plastic main a plastic member having a frustoconical end portion and a through-bore with a cutter disposed at one end of said bore and simultaneously welding to said member a plastic tubular fitting having a through-bore comprising the steps of:
   mounting said member at one end of said fitting with the bore of said member in alignment with the bore of said fitting and with a portion of the surface of said member in contact with a portion of the surface of said end of said fitting,
   positioning said member and said fitting generally transverse of the longitudinal axis of said pipe with the end of said member proximate said cutter engaging the exterior surface of said pipe,
   applying force along the longitudinal axis of said fitting to maintain the surface of the end portion of said fitting in intimate contact with the surface of said member and the end portion of said member in intimate contact with the surface of said pipe,
   rotating said member about the longitudinal axis of its bore at a high speed while maintaining said fitting and said pipe substantially stationary relative to said rotating member to develop frictional heat between the surface of said member in contact with the surface of said fitting and the surface of said member in contact with the surface of said pipe to thereby soften the material of said contacting surfaces so that the end of said member will move through the softened material to thereby increase the area of surface contact between said pipe and said end of said member,
   cutting a hole through said surface of said pipe as said rotating member moves into said pipe surface,
   discontinuing rotation of said member upon completing said hole cutting, and
   discontinuing the application of force when the plastic material of said contacting surfaces of said member and said fitting and said end portion of said member and said pipe has become securely bonded to one another.

3. The method of claim 2 including the step of applying a predetermined force to said member along its longitudinal axis in addition to the force transmitted to said member through said fitting so that the resultant contact pressure between the end of said member and said pipe will be greater than the contact pressure between the end portion of said fitting and said member.

4. Apparatus for friction welding a plastic tubular fitting having a through-bore to a plastic member having a surface portion for engaging the surface portion of one end of said fitting, said member having a through-bore alignable with said bore of said fitting and a frustoconical end portion, said member having a tapping plug disposed in and detachably connected to said bore of said member including a cutting element carried by said plug and located adjacent the end portion of said member, substantially simultaneously friction welding said end portion of said member to a plastic pipe while cutting a perforation in said pipe, said apparatus comprising:
   support means for said tubular fitting including means for detachably engaging a portion of said fitting to restrict relative movement between said fitting and said support means,
   first means detachably engageable with said tapping plug for moving said member connected to said plug into and out of contact with said surface portion of said fitting,
   second means engageable with said tapping plug for rotating said plug and said member connected to said plug about the axis of the bore of said member so that frictional heat will be developed to form a bond between the surface of said fitting in contact with the surface of said member and between the end portion of said member in contact with the surface of said pipe and substantially simultaneously a perforation will be formed in said pipe by said cutting element.

5. The apparatus as claimed in claim 4 wherein said support means comprises a cylindrical housing having a through-bore for receiving said tubular fitting and an annular shoulder for engaging the other end of said tubular fitting.

6. The apparatus as claimed in claim 5 wherein said housing is provided at one end with a rotatable collar carrying said shoulder and a threaded surface portion disposed about the interior wall of said collar adjacent said shoulder for engaging the external threads of a tubular fitting.

7. The apparatus as claimed in claim 5 wherein said housing is provided on its exterior with a handle.

8. The apparatus as claimed in claim 5 wherein said tubular fitting is provided with a lateral outlet and said housing is provided with a slot in its sidewall for receiving said lateral outlet.

9. The apparatus as claimed in claim 5 wherein said first means comprises a shaft disposed for rotation relative to said housing about the longitudinal axis of said housing and having one end extending beyond said housing and its other end provided with means for engaging said tapping plug.

10. The apparatus as claimed in claim 9 wherein said one end of said shaft is rotatably supported by a driving head, said driving head being rotatably disposed on said housing whereby said shaft is rotatable independently of the rotation of said driving head.

11. The apparatus as claimed in claim 9 wherein the end of said shaft is threaded for engaging a centrally disposed threaded bore in said tapping plug.

12. The apparatus as claimed in claim 5 wherein said second means comprises a hollow cylindrical tube disposed for rotation relative to said housing about the longitudinal axis of said housing and having one end extending beyond said housing and its other end provided with means for engaging said tapping plug so that rotation of said hollow cylindrical tube will effect rotation of said tapping plug and said member connected to aid plug.

13. The apparatus as claimed in claim 12 wherein said one end of said hollow cylindrical tube is disposed in a driving head and said driving head is rotatably disposed on said housing so that rotation of said driving head will effect rotation of said hollow cylindrical tube relative to said housing.

14. The apparatus as claimed in claim 12 wherein said tapping plug is provided at its end opposite said cutting element with a plurality of grooves and said other end of said hollow cylindrical tube is provided with a plurality of mating lugs locatable in said grooves whereby rotation of said hollow cylindrical tube will effect rotation of said plug when said lugs are disposed in said grooves.

15. The apparatus as claimed in claim 14 wherein said housing is provided at one end with a collar disposed for rotation relative to said housing about the longitudinal axis of said housing and means are provided for locking said collar against said rotation, said housing being formed at said one end with a counterbore for receiving a bottom portion of said collar, the interior sidewall of said bottom portion of said collar being threaded for engaging the external threads of a tubular fitting, said collar being provided with a radially extending interior flange adjacent said bottom portion forming an abutment surface for the other end of said tubular fitting, the side of said flange opposite said abutment surface having located thereon bearing means spaced radially inwardly of the wall of said collar, said bearing means comprising a lower circular member disposed on said flange radially spaced from the longitudinal axis of said housing an an upper circular member disposed for rotation relative to said lower circular member, about said longitudinal axis, said collar extending beyond said upper circular member and carrying an annular bushing element disposed about the interior circumference of said collar, a driving head having a lower portion positionable in said collar adjacent said bushing element with one end engaging said upper circular bearing member, said lower portion of said driving head having a central bore alignable with the bore of said housing, said bore of said driving head having diametrically opposed key slots formed longitudinally therein, said driving head having a centrally disposed threaded bore in its upper portion with a threaded bushing disposed in said threaded counterbore, a spring member disposed in said bore with one end in engagement with the lower end of said threaded bushing, a driving shaft having key means proximate one end thereof and a through-bore, said driving shaft being disposed along the longitudinal axis of said housing with said key means engaging said key slots in said bore of said driving head, said driving shaft being formed at the other end thereof with lugs for engaging grooves in said opposite end of said tapping plug, a central shaft disposed in the bore of said driving shaft and extending beyond both ends of said driving shaft, the lower end of said central shaft having threads for engaging a centrally disposed threaded bore in said tapping plug, means engaging said one end of said driving shaft for retaining said central shaft in the bore of said driving shaft, the other end of said spring member engaging said retaining means.

16. A service T for connecting a service pipe to a plastic main comprising a first plastic member having a tubular body portion with a through-bore and a lateral outlet, said body portion having at one end exterior and interior threads, a second plastic member having a through-bore and a frustoconical end portion formed to be friction welded to the plastic main, said second plastic member having an annular shoulder spaced from said end portion and formed to be friction welded to the other end of said body portion of said first plastic member.

17. A service T as claimed in claim 16 wherein a circumferential groove is formed in the wall of said first plastic member between said interior threads and said one end of said body portion and an O-ring is disposed in said groove.

18. A service T as claimed in claim 16 including a tapping plug having an exteriorly threaded lower portion, said bore of said second plastic member having interior threads for receiving the exterior threads of said tapping plug, said tapping plug having a circular cutter fixed to the lower portion thereof.

19. A service T as claimed in claim 18 wherein said tapping plug is provided with an exteriorly threaded upper portion for engaging the interior threads of said body of said first plastic member.

20. A service T as claimed in claim 18 wherein aid tapping plug is provided with a needle for impaling and retaining a coupon cut by said circular cutter, one end of said needle being rigidly embedded in said plug, the other end of said needle extending beyond the cutting edge of said circular cutter.

21. A service T as claimed in claim 18 wherein said second plastic member is provided with a neck portion insertable within the bore of said first plastic member, said neck portion extending from said annular shoulder and having an inwardly tapered annular end portion; and said tapping plug is provided exteriorly thereof with a tapered annular shoulder between said upper and lower threaded portions, said tapered annular shoulder of said plug being engageable with said tapered annular end portion of said neck portion to form a fluidtight seal when the lower portion of said plug is threaded into the bore of said second plastic member.

22. A service T as claimed in claim 18 wherein said tapping plug is provided at its upper end with first means for engaging a tool to effect rotation of said plug relative to said second plastic member and second means at its upper end for engaging a tool to effect rotation of said plug and said second plastic member relative to said first plastic member.

* * * * *